(12) United States Patent
Robertson

(10) Patent No.: US 9,429,754 B2
(45) Date of Patent: Aug. 30, 2016

(54) WEARABLE ASSEMBLY AID

(71) Applicant: Nissan North America, Inc., Franklin, TN (US)

(72) Inventor: Timothy H. Robertson, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 471 days.

(21) Appl. No.: 13/962,276

(22) Filed: Aug. 8, 2013

(65) Prior Publication Data

US 2015/0042785 A1  Feb. 12, 2015

(51) Int. Cl.
| | | |
|---|---|---|
| *G06T 7/00* | (2006.01) | |
| *G02B 27/01* | (2006.01) | |
| *G06K 9/78* | (2006.01) | |
| *G06K 9/00* | (2006.01) | |
| *G06K 9/32* | (2006.01) | |

(52) U.S. Cl.
CPC ......... *G02B 27/017* (2013.01); *G06K 9/00671* (2013.01); *G06K 9/3216* (2013.01); *G06K 9/78* (2013.01); *G02B 2027/014* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | |
|---|---|---|
| 7,720,436 B2 | 5/2010 | Hamynen et al. |
| 8,279,716 B1 | 10/2012 | Gossweiler, III et al. |
| 8,410,927 B2 | 4/2013 | Gabara |
| 2002/0167536 A1 | 11/2002 | Valdes et al. |
| 2008/0159601 A1 | 7/2008 | Alberth et al. |
| 2010/0238161 A1 | 9/2010 | Varga et al. |
| 2011/0161875 A1 | 6/2011 | Kankainen |
| 2011/0173576 A1 | 7/2011 | Murphy et al. |
| 2012/0007852 A1 | 1/2012 | Morate et al. |
| 2012/0019557 A1 | 1/2012 | Aronsson et al. |
| 2012/0093357 A1 | 4/2012 | Seder et al. |
| 2012/0303336 A1 | 11/2012 | Becker et al. |
| 2013/0044042 A1 | 2/2013 | Olsson et al. |
| 2013/0046592 A1 | 2/2013 | Ross |

OTHER PUBLICATIONS

Banner Engineering Corporation, The Photoelectric Specialist, Parts Verification Array, Date Unknown, 8 pp.
Allen-Bradley, Rockwell Software, Photoswitch Light Arrays, "Detect or Measure Targets Anywhere in a Two Dimensional Area—Even if the Parts Are Irregularly Shaped, Sized, or Positioned", Nov. 2010, 4 pp.

*Primary Examiner* — Kate Luo
(74) *Attorney, Agent, or Firm* — Young Basile Hanlon & MacFarlane, P.C.

(57) ABSTRACT

Methods, devices and systems are provided for aiding an operator in performing an assembly operation by displaying the position of a component using a device worn by the operator. In one aspect, a method of aiding an operator in performing an assembly operation at an assembly station comprises: scanning the assembly station, using a camera, for the position of a component identified to be used in the assembly operation; and displaying, using a display worn by the operator, the position of the identified component within the assembly station to the operator.

18 Claims, 13 Drawing Sheets

WEARABLE ASSEMBLY AID

TECHNICAL FIELD

The embodiments disclosed herein relate in general to equipment for displaying the position of a component to an operator.

BACKGROUND

An assembly operation for a product, such as a vehicle, may entail an operator selecting one or more of a multitude of components for assembly into the product. Improving the speed and accuracy of the assembly operation are examples of ongoing objectives that may be accomplished, for example, by improving the equipment used by the operator.

SUMMARY

The present disclosure relates to methods, devices and systems for aiding an operator in performing an assembly operation by displaying the position of a component using a device worn by the operator.

In one aspect, a method of aiding an operator in performing an assembly operation at an assembly station includes: scanning the assembly station, using a camera, for the position of a component identified to be used in the assembly operation; and displaying, using a display worn by the operator, the position of the identified component within the assembly station to the operator.

In another aspect, a device for aiding an operator in performing an assembly operation at an assembly station includes a display and a controller. The display is adapted to be worn by the operator. The controller is in communication with the display and is programmed to: in response to an identification of a component to be used in the assembly operation, and a determination, based on at least one captured image of the assembly station, of the position of the identified component within the assembly station, operate the display to display the position of the identified component within the assembly station to the operator.

In yet another aspect, a system for aiding an operator in performing an assembly operation at an assembly station includes a display, a camera and at least one controller. The display is adapted to be worn by the operator. The camera is configured to capture images. The at least one controller is in communication with the display and the camera and is programmed to: identify one of a plurality of assembly stations as the assembly station at which the operator is located; identify a component to be used in the assembly operation based on an assembly routine for the identified assembly station; operate the camera to capture at least one image of the assembly station; determine the position of the identified component within the assembly station based on the at least one captured image of the assembly station; and operate the display to display the determined position of the identified component within the assembly station to the operator.

These and other aspects will be described in additional detail below.

BRIEF DESCRIPTION OF THE DRAWINGS

The various features, advantages and other uses of the present methods, devices and systems will become more apparent by referring to the following detailed description and drawings in which.

DETAILED DESCRIPTION

As disclosed herein, an operator in an assembly station may be equipped with a wearable device configured to aid the operator in the assembly of a product. In the disclosed implementations, after an assembly station is scanned for a component required for an upcoming assembly operation, the wearable device is operated to display the location of the component to the operator.

Figure 1:
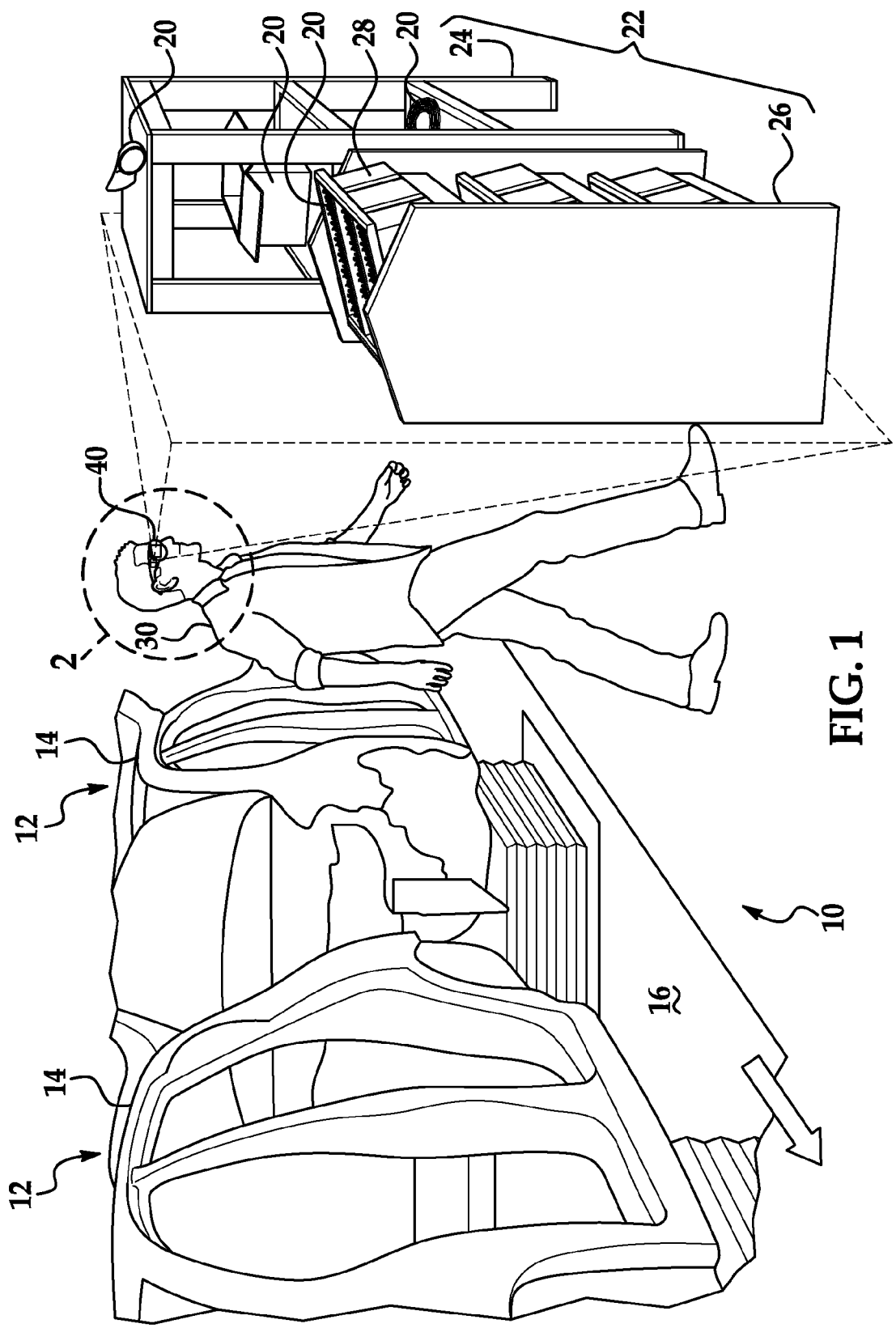
FIG. 1 is a perspective view of an assembly station, showing an operator, an area containing various components for the operator to select for assembly into a product, and an example of a wearable device for the operator that is equipped with a camera and a display.

FIG. 1 depicts an assembly line 10 including one or more assembly stations 12 that are adapted for supporting the assembly of one or more products 14. In the illustrated example, the products 14 are vehicles, although the assembly stations 12 could be adapted for supporting the assembly of a vehicle part or other types of products. As shown, the assembly line 10 may optionally be equipped with componentry, such as the illustrated floor conveyor 16, to move the products 14 sequentially through multiple assembly stations 12. In this example, the assembly stations 12 may be collectively adapted for supporting a progressive assembly of the products 14, although in alternative examples, a single assembly station 12 could be adapted for individually supporting the assembly of one or more of the products 14. The assembly stations 12 according to these or other examples may be adapted for supporting pre-assembly, final-assembly or post-assembly operations for the products 14, for example, as well as according to repair or maintenance operations for the products 14.

The illustrated assembly stations 12 contain a number of different components 20 that are each configured for assembly into the products 14 according to respective assembly routines for the assembly stations 12. Each of the components 20 may be an individual part, a collection of similar or different individual parts, a sub-assembly or other constituent portion of the products 14. As generally shown, the components 20 may but need not be boxed or otherwise packaged. According to the illustrated example where the products 14 are vehicles, the components 20 may include without limitation fasteners, wiring harnesses or body panels, for example.

The assembly stations 12 may include a variety of storage structures 22, such as the shelves 24 and the bin rack 26 with bins 28 illustrated in FIG. 1, for example, for housing and/or organizing the components 20 in the assembly areas 12. The storage structures 22 can be common to multiple assembly stations 12 as shown, although one, some or all of the assembly stations 12 could have one or more dedicated storage structures 22. The components 20 are shown in the storage structures 22 in accordance with one example of an overall assembly environment for the assembly stations 12. However, in alternative examples, some or all of the components 20 can be freestanding in the assembly stations 12 independently from the illustrated or other storage structures 22.

As shown, the assembly stations 12 may also be occupied with one or more operators 30 (i.e., personnel) trained to perform assembly operations in which a component 20 is assembled into a product 14. In preparation to perform a given assembly operation, the operator 30 must select the correct component 20.

If the operator 30 is required to perform a variety of assembly operations using different components 20, either at a single assembly station 12, or as the operator 30 moves to different assembly stations 12 throughout a work shift, the selection of a correct component 20 for a given assembly operation may on occasion cost the operator 30 valuable time and effort. For example, the operator 30 may have to spend time reorienting themselves to the given assembly operation and/or the position of the correct component 20 upon switching from an assembly operation using a different component 20, or the operator 30 may have to spend time finding the correct component 20 and confirming its correctness upon switching from an assembly operation using a component 20 having similar physical characteristics as the correct component 20, or the operator 30 may have to spend time locating the correct component for the given assembly operation if its position within the assembly station 12 has changed since a previous performance of the assembly operation. Even if the operator 30 is generally focused on a given assembly operation and aware of the location of the correct component 20, the operator 30 may still benefit from a confirmation that a component 20 that the operator 30 intends to select is the correct one.

Figure 2:
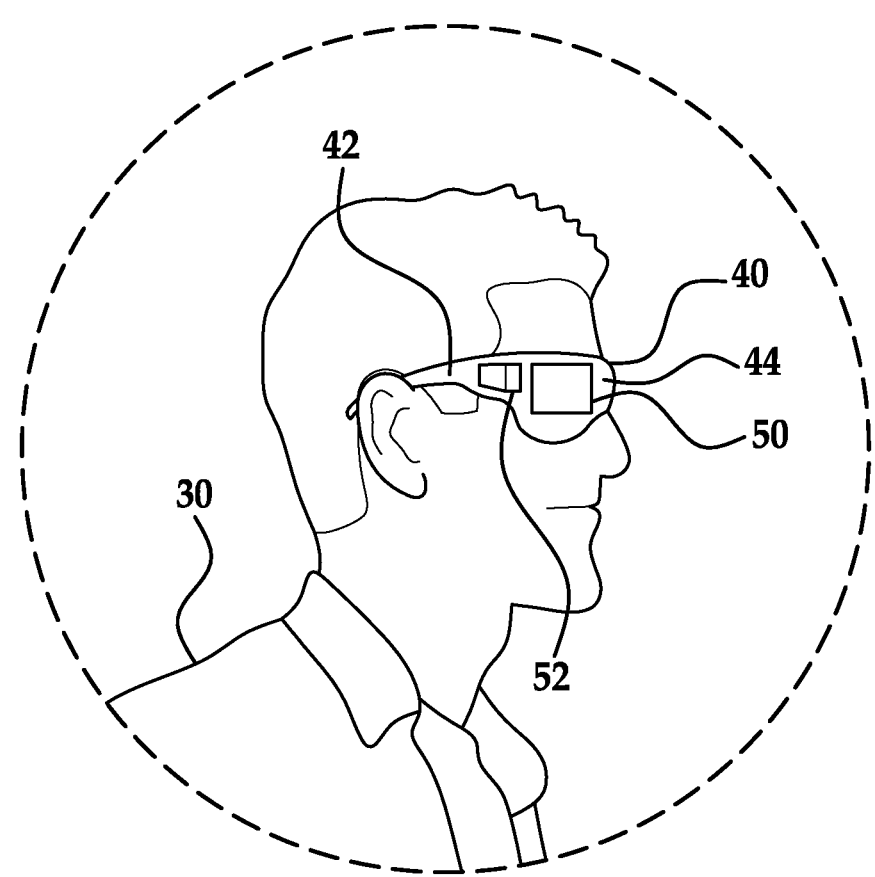
FIG. 2 is a detailed perspective view of the wearable device.
Figure 3:
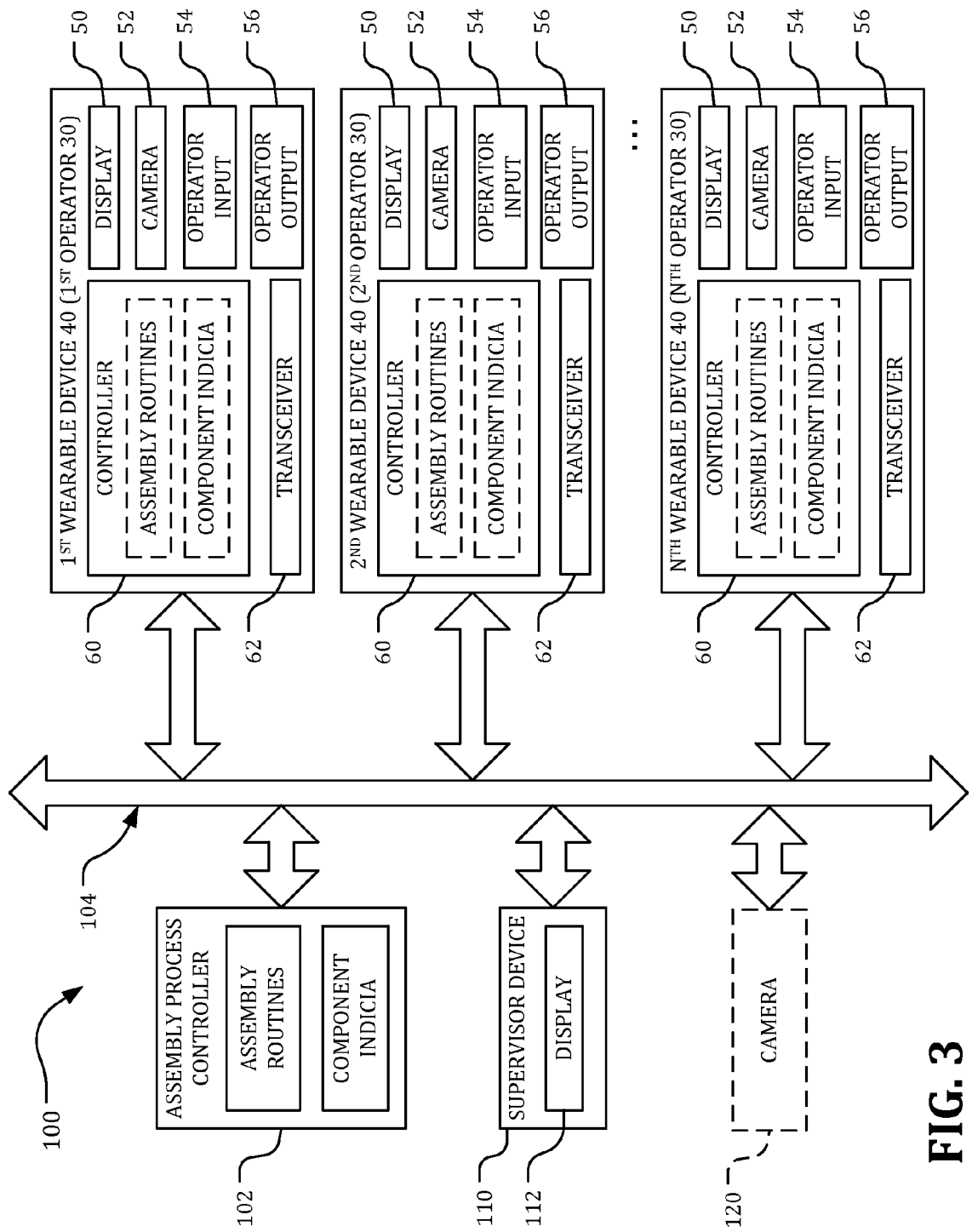
FIG. 3 is a block diagram of a system configured to control the operation of multiple wearable devices to aid respective operators in performing assembly operations.

As shown in FIGS. 1 and 2, the operator 30 may be equipped with a wearable device 40 which, as shown schematically in FIG. 3, may be included in a system 100 for controlling the operation of the wearable device 40 to aid the operator 30 in selecting components 20. The system 100 may include one or more wearable devices 40, as generally shown, but is described with reference to a singular wearable device 40 for ease of understanding. However, it will be understood that the description is applicable in principle to any number of wearable devices 40.

The wearable device 40 in the illustrated example is configured as a pair of safety glasses constructed to include an eyewear frame 42 adapted to attach to the operator 30's head in a conventional manner and protective lenses 44 supported by the eyewear frame 42.

A display 50 is supported by the eyewear frame 42 such that, when the wearable device 40 is worn by the operator 30, the display 50 is positioned in the immediate field of view of the operator 30 so as to visually display information to the operator 30. In this example, the display 50 is supported at a position generally corresponding to one of the lenses 44. The display 50 may be connected to or integrated with the lens 44, for example, or may be a separate component provided adjacent the lens 44. In one non-limiting example, the display 42 may be a screen configured to directly display information to the operator 30, for instance, while in other examples, the display 42 may be configured to display information projected from elsewhere.

The wearable device 40 in the illustrated example has a camera 52 which, as shown, is generally supported by the eyewear frame 42 similarly to the display 50. With the wearable device 40 worn by the operator 30, the camera 52 can capture images of the assembly station 12 generally and the components 20 specifically, as indicated in FIG. 1.

The wearable device 40 may further optionally include an operator input module 54 and an operator output module 56 for permitting communication between the wearable device 40 and the operator 30. The operator input module 54 may include a microphone and any variety of buttons, for instance, while the operator output module 56 may include for example a speaker and a force feedback system for providing haptic feedback to the operator 30.

The example wearable device 40 includes a controller 60 for controlling the overall operation of the wearable device 40 and a transceiver 62 configured to enable the wearable device 40 for wireless communications. As shown in FIG. 3, in the system 100, the wearable device 40 is communicatively coupled to an assembly process controller 102 for the assembly line 10 over a communications channel 104. The communication channel 104 is configured to allow for sharing of information, data and/or computing resources between the wearable devices 40 and the assembly process controller 102. The communication channel 104 may be a wired or wireless channel, for example, using an industry standard or proprietary protocol. In the illustrated implementation, the communication channel 104 may implement Wi-Fi network or other technology to permit the wearable device 40 to communicate wirelessly over the communications channel 104 via the transceiver 62.

The controller 60 of the wearable device 40 and the assembly process controller 102 may each be one or multiple computers including a random access memory (RAM), a read-only memory (ROM) and a central processing unit (CPU) in addition to various input and output connections. Generally, the control functions described herein can be implemented by one or more software programs stored in internal or external memory and are performed by execution by the respective CPUs of the controller 60 and the assembly process controller 102. However, some or all of the functions could also be implemented by hardware components.

In one illustrated implementation of the system 100, the assembly process controller 102 is configured with memory for storing assembly routines for the assembly stations 12. For a given assembly station 12, an assembly routine may generally set forth information and/or instructions concerning assembly operations involving a component 20 being assembled into a product 14 by an operator 30. In addition, the assembly process controller 102 is configured with memory for storing component indicia for the components 20 used in the assembly operations, as explained in additional detail below.

Although the controller 60 of the wearable device 40 and the assembly process controller 102 are shown as separate units and described as performing respective operations, it will be understood that the operational aspects of the controller 60 and the assembly process controller 102 may be distributed differently as desired. In one illustrated alternative implementation of the system 100, for example, the controller 60 is configured with memory for storing the assembly routines and/or component indicia. In this example, some or all of the operational aspects of the assembly process controller 102 could be embodied in the controller 60.

The system 100 may include a supervisor device 110 with a display 112 for displaying notifications or other information concerning the operator 30's performance of assembly operations. The supervisor device 110 in one non-limiting example could be constructed similarly to the wearable device 40 to position the display 112 in the immediate field of view of a supervisor. In alternative examples, the supervisor device 110 could be a handheld or other device having the display 112 or other means of conveying information.

Although the operations of the system 100 and wearable device 40 are described below with reference to the illustrated implementation, where the wearable device 40 includes the camera 52, the system 100 may additionally or alternatively include a camera 120 separate from the wearable device 40, as generally shown. The camera 120 is similar in configuration and operation to the camera 52, and like the camera 52, may be positioned to capture images of the assembly station 12 and/or the components 20. The camera 52 may however, for instance, be stationary with respect to the assembly station 12 and/or the components 20. In one example of a system 100 including both the camera 52 and the camera 120, images captured by the camera 120 can be used in conjunction with images captured by the camera 52 in support of some or all of the operations of the system 100 and/or wearable device 40.

Figure 4:
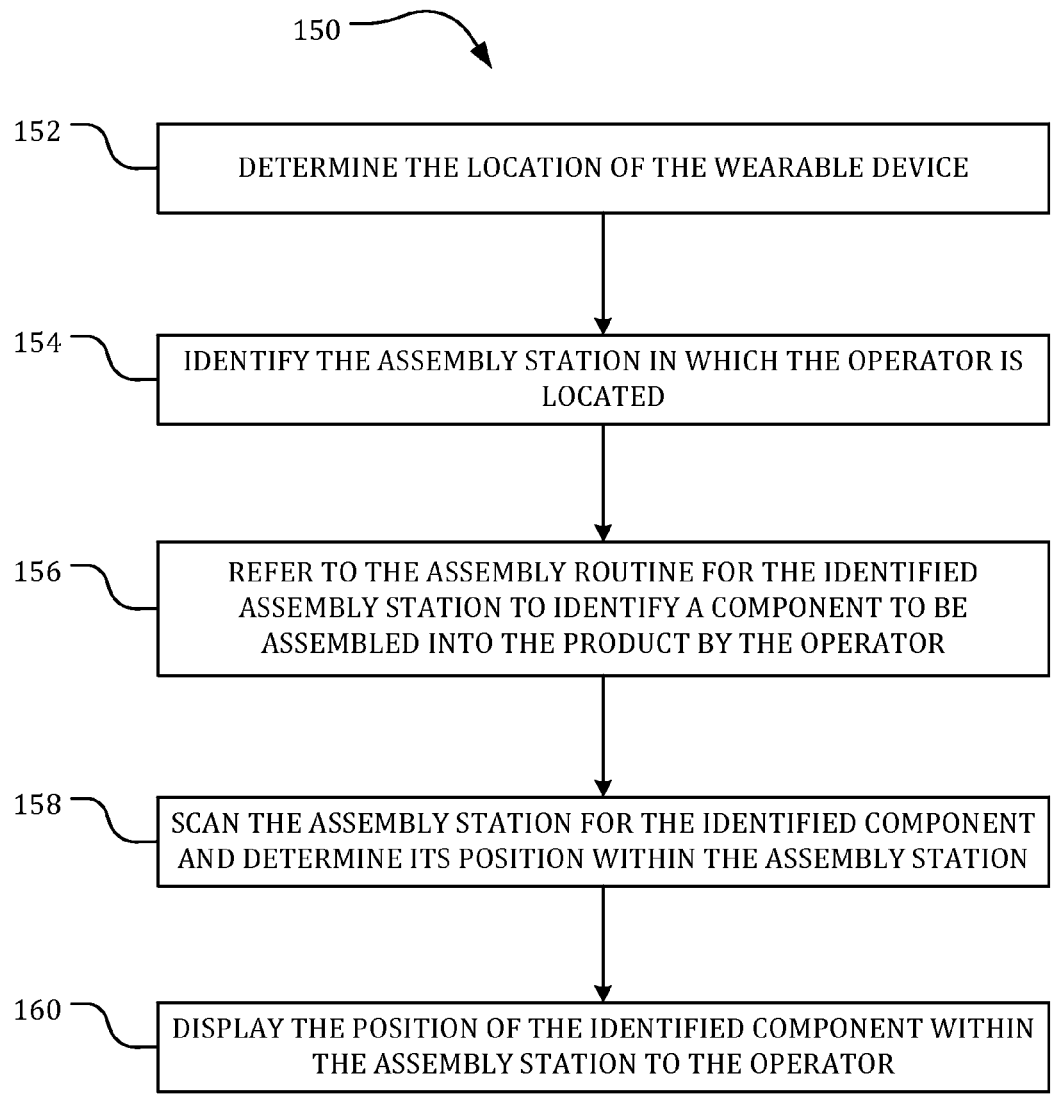
FIG. 4 is a flow diagram showing the operations of a process for identifying a component to be assembled into a product by an operator, determining the position of the component, and displaying the position of the component to the operator.

The operations of an example process 150 for aiding the operation 30 in selecting the correct component 20 for a given assembly operation are shown in FIG. 4.

In operation 152, the location of the wearable device 40 is determined. Since the wearable device 40 is adapted to be worn by the operator 30, it may be assumed that the location of the wearable device 40 corresponds to the location of the operation 30, and that by determining the location of the wearable device 40, the location of the operator 30 can be determined. In operation 154, after the location of the wearable device 40 is determined, the determined location of the wearable device 40 can be correlated to information concerning the locations of the assembly stations 12 to identify the assembly station 12 in which the operator 30 wearing the wearable device 40 is located. In one non-limiting example, the operations 152 and 154 may be performed using the physical locations of the wearable device 40 and the assembly stations 12. In this example, the location of the wearable device 40 could be determined using, for instance, a GPS or other positioning system, and could be compared against known physical locations of the assembly stations 12 to identify the assembly station 12 in which the operator 30 wearing the wearable device 40 is located.

In other implementations of the process 150, the assembly station 12 in which the operator 30 wearing the wearable device 40 is located can be identified in step 154 without reference to the physical location of the wearable device 40 and/or assembly station 12. For instance, one or more images captured by the camera 52 could be compared against the physical characteristics of the assembly stations 12 to identify the assembly station 12 in which the wearable device 40 and the operator 30 are located. Alternatively, the operator 30 could communicate presence at a particular assembly station 12 through the operator input module 54, for example, prior to beginning work at the assembly station 12.

In operation 156, the assembly routine for the identified assembly station 12 is referenced to identify, for a given assembly operation of the assembly routine, which component 20 must be selected by the operator 30 for assembly into a product 14 in accordance with the given assembly operation. In identifying a particular component 20, it will be understood that the system 100 may be dynamically responsive to updates in the assembly routine based on, for instance, performance schedules for the assembly operations of the assembly routine and/or changes in the conditions of the assembly station 12.

In operation 158, the assembly station 12 is scanned for the identified component 20, and, once the identified component 20 is found, its position within the assembly station 12 is determined.

Figure 5:
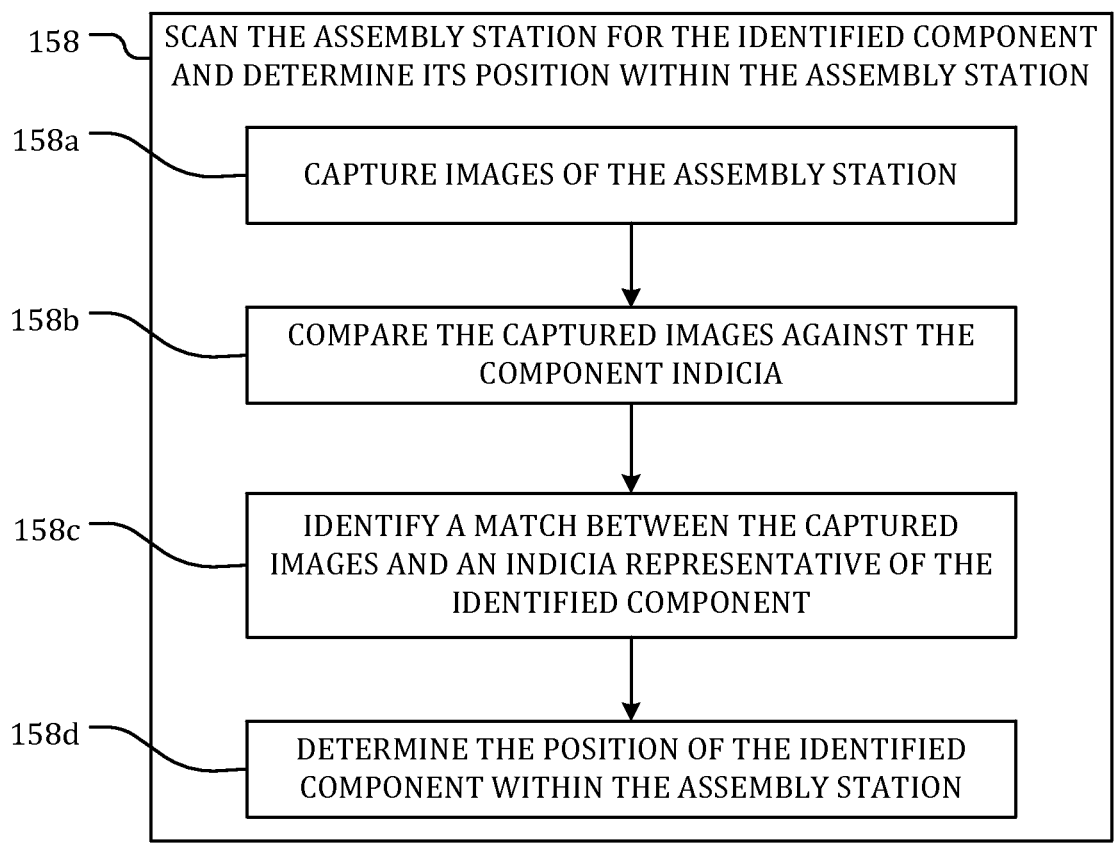
FIG. 5 is a flow diagram depicting the operations of a process for determining the position of the component in the flow diagram of FIG. 4.

As shown in FIG. 5, in operation 158a, the camera 52 is controlled to capture one or more images of the assembly station 12. In accordance with one non-limiting implementation of the wearable device 40 presented below, the captured images may contain optical data relating to the assembly area 12 and the components 20, although it will be understood that in other implementations the images could correspond to one or more of radio frequencies, electronic signals, heat profiles or other machine readable data relating to the assembly area 12 and/or the components 20.

Figure 6:
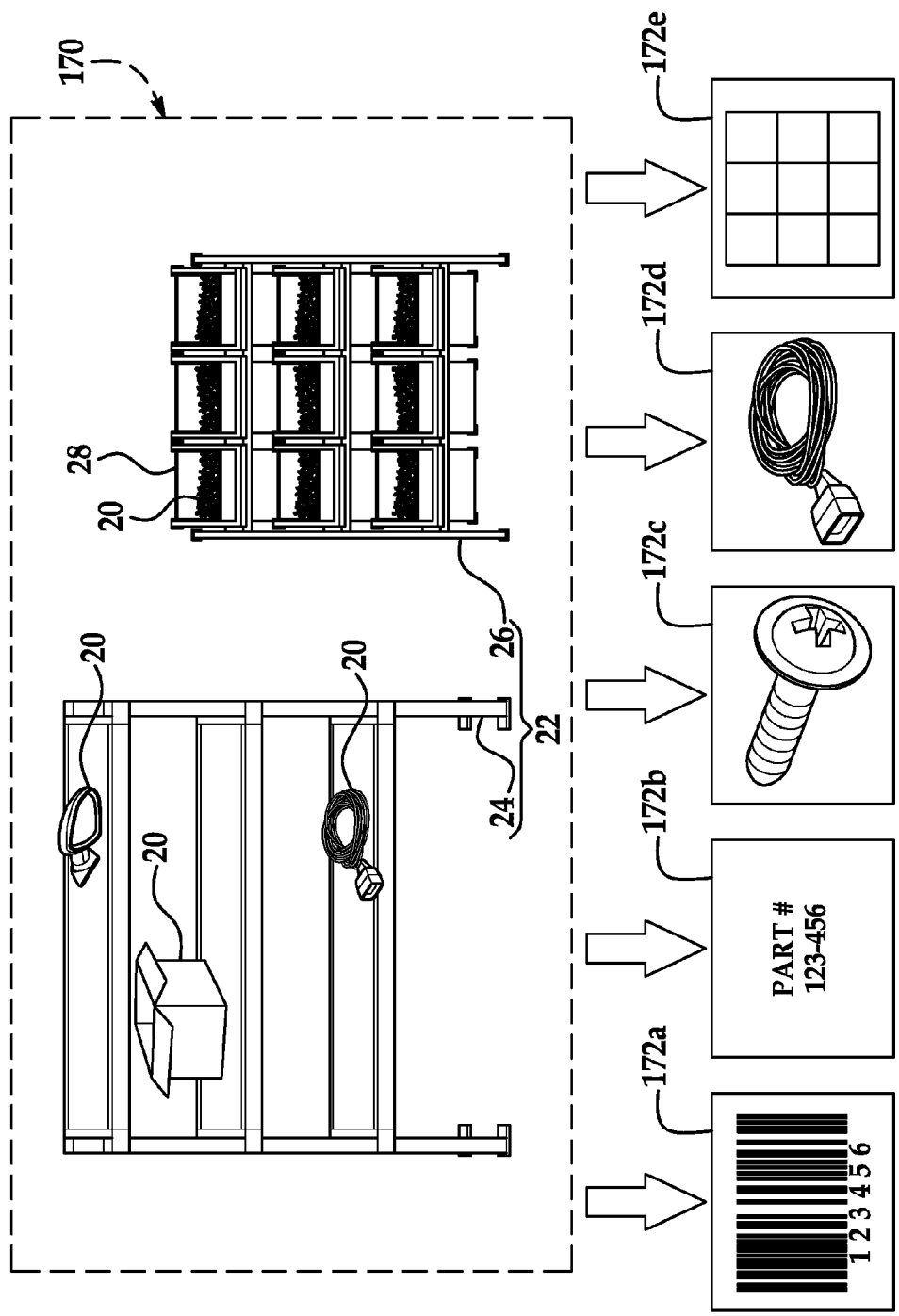
FIG. 6 is an example of an image of the assembly station captured by the camera for use in performing the process of FIG. 5.

An example of an image 170 captured by the camera 52 is shown in FIG. 6. As generally shown, the captured image 170 may include various examples of component indicia 172a-e for the components 20. The component indicia 172a-e may be any information recoverable from the captured image 170 and usable for a computerized determination of the identity of a particular component 20. For instance, the component indicia 172a-e may relate to identifying markings on the components 20, whether on the components 20 directly or on their packaging, to the physical characteristics of the components 20, or to the composition of the storage structures 22 in or on which the components 20 are housed and/or organized. In the non-limiting examples shown, a component indicia 172a is a bar code, a component indicia 172b is a part number, a component indicia 172c is a rendering of a component 20, a component indicia 172d is a likeness of a component 20, and a component indicia 172e is a likeness of the array-like arrangement of the bins 28 in the bin rack 26. Although the component indicia 172a-e are provided as examples, it will be understood that any other information that can be taken or derived from the data of the captured image 170 may be used to generate one or more indicia for the components 20.

In operation 158b, the captured image 170 generally, and the component indicia 172a-e specifically, are compared against the component indicia stored in memory at the assembly process controller 102. The stored component indicia may be similar in form to the component indicia 172a-e. For example, the stored component indicia could be bar codes, part numbers, renderings of the components 20, likenesses of the components 20, or likenesses of the storage structures 22. In another non-limiting example, the stored component indicia may be CAD or other data indicative of the overall shape, size and other visual or physical characteristics of the components 20.

In an exemplary implementation of the system 100, the assembly process controller 102 includes at least one stored component indicia for each of the components 20 in the assembly station 20. It will of course be understood that the assembly process controller 102 can additionally include many other stored component indicia corresponding to other components 20 used throughout the assembly stations 12 of the assembly line 10. Each of the components 20 in the assembly station 12 may have a single corresponding stored component indicia, for example. Alternatively, one or more of the components 20 may have multiple corresponding stored component indicia to provide multiple opportunities for finding the components 20 in the assembly area 20.

In operations 158c and 158d, the captured image 170 is compared against the stored component indicia for the identified component 20 to identify one or more matches between a stored component indicia for the identified component 20 and least one of the component indicia 172a-e of the captured image 170, and the matches, if any, are used to determine the position of the identified component 20 within the assembly station 20. In some instances, a match may involve a stored component indicia and a component indicia 172a-e of the captured image 170 that are similar in form. In other instances, a match may involve a stored component indicia and a component indicia 172a-e of the captured image 170 that are different in form. For example, the representative component indicia 172d, which is a likeness of a component 20, could be matched to stored CAD data for the component 20.

It can be seen that the system 100 in certain examples may be capable of determining the position of the identified component 20 independently of known or assumed positions of the components 20. In other examples, the determination of the position of the identified component 20 may be made in whole or in part based on known configurations of the assembly station 12, and/or the storage structures 22, with respect to the components 20. For instance, in an example where the component indicia 172e is matched to a stored component indicia of a likeness of the array-like arrangement of the bins 28 in the bin rack 26, knowledge that the identified component 20 is stored in a particular one of the bins 28 can be used to determine the location of the identified component 20. Even in this instance, however, the system 100 could still be capable of adjusting to movement of the bin rack 26, for example, or rearranging of individual bins 28 within the bin rack 26.

Referring again to FIG. 4, in operation 160, the determined position of the identified component 20 within the assembly area 12 is displayed to the operator 30. The position of the identified component 20 may be displayed by controlling the display 50 to display information to the operator 30, whether in the form of text, symbols or other visual elements that, either alone or in combination with the operator 30's visual apprehension of the assembly station 12, indicates the position of the identified component 20 within the assembly station 12.

Figure 7:
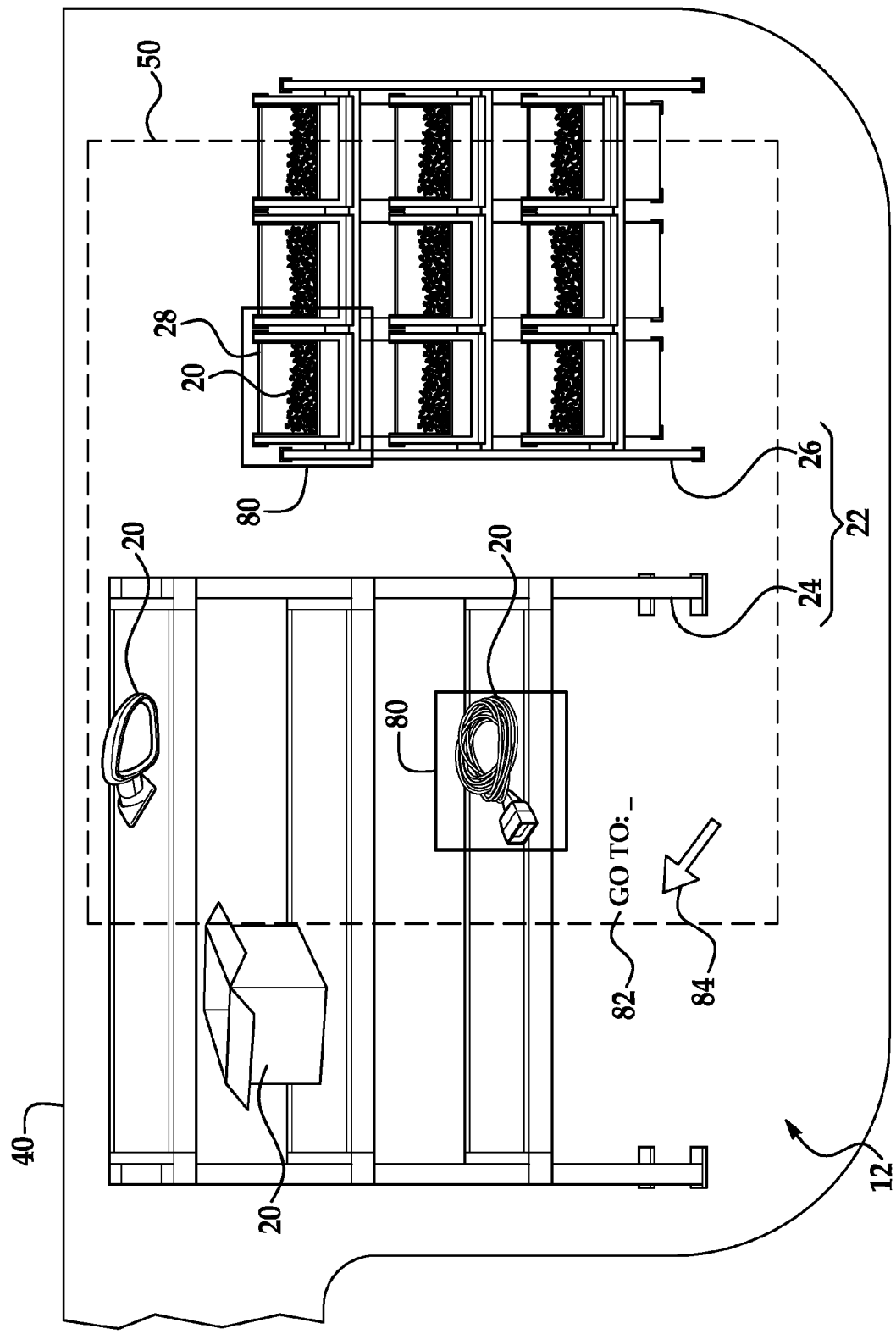
FIG. 7 is a perspective view of the assembly station, taken from the point of view of the operator wearing the wearable device, showing an example of the display displaying the position of a component to the operator according to the process of FIG. 4.

As generally shown in FIG. 7, the display 50 in one example may display a box 80 that is selectively situated for interposition, from the point of view of the operator 30, around an identified component 20. In another example, the display 50 may additionally or alternatively display a "GO TO:" command 82 to the operator 30 to, for instance, direct the operator 30 to select the identified component 20 from a particular storage structure 22 or a particular portion of a storage structure 22 (e.g., a specific bin 28 in the bin rack 26). In yet another example, the display 50 may display a directional command 84 to indicate that the display 50 is out of position, in relation to the operator 30's visual apprehension of the assembly station 12, for displaying the position of the identified component 20, and thereby instruct the operator 30 to reposition the display 50 in accordance with the directional command 84. In these or other examples, the information displayed on the display 50 can be displayed steadily, for example, or in a flashing manner.

It will be understood that the above described and illustrated operations of the display 50 are provided as representative non-limiting examples, and that the display 50 could be otherwise operated to effectuate an indication to the operator 30 of the position of the identified component 20 for a given assembly operation. Additionally, if desired, the display 50 can be operated as described above in combination with other communications to the operator 30 provided, for example, using elements of the operator output module 56.

It can be seen that the system 100 implementing the wearable device 40 can account for a variety of changes in a dynamic assembly environment, including without limitation changes in the position of the operator 30, changes in the assembly routine at a given assembly station 12, and/or changes in the position of the components 20 in the assembly station 12, and still decisively indicate to the operator 30 which of a wide variety of components 20 is the correct one to select for a given assembly operation. The system 100 in operation can save the operator 30 valuable time and effort in selecting the component 20 identified for the assembly operation, as well as provide the operator 30 with confidence that the identified and selected component 20 is correct.

The system 100 can alternatively and/or additionally be operated to perform other functions in aid of the operator 30's performance of a given assembly operation.

Figure 8:
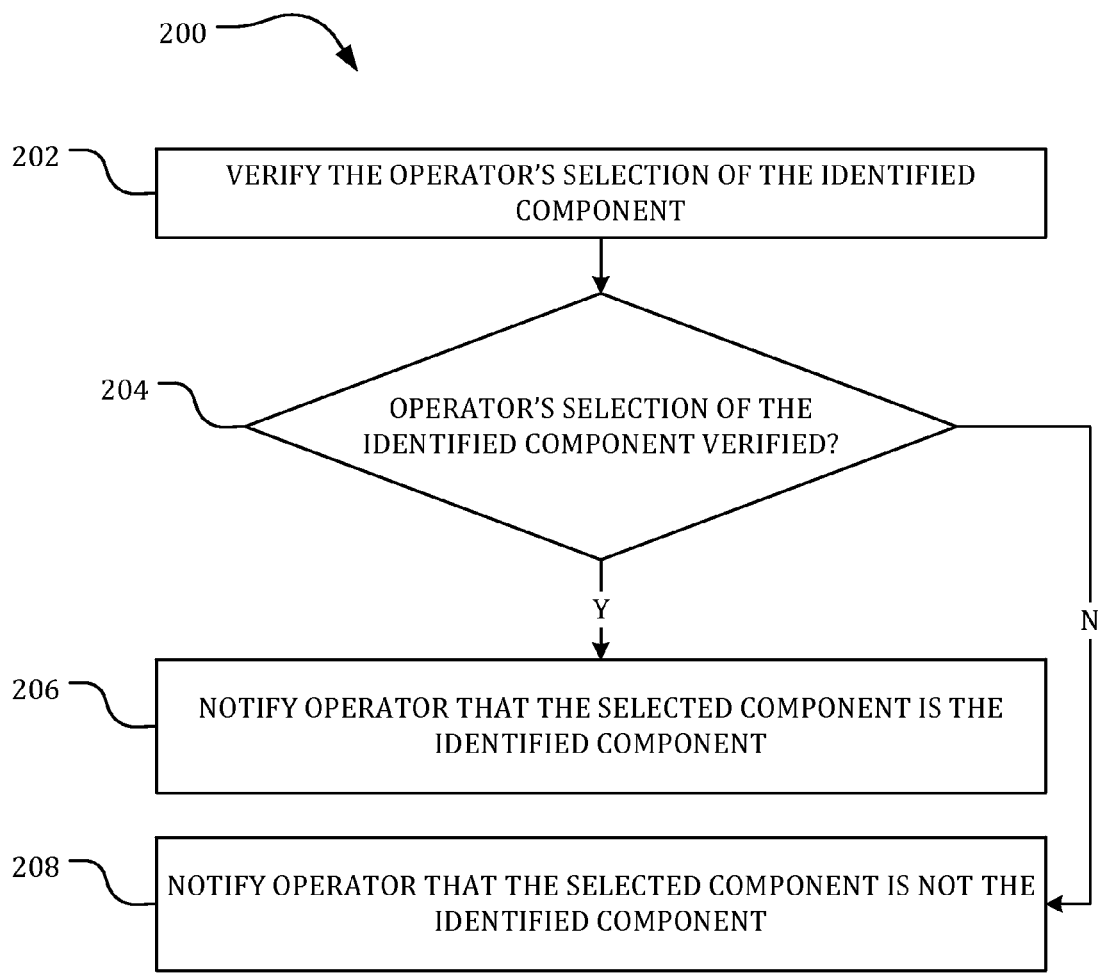
FIG. 8 is a flow diagram depicting the operations of a process for verifying the operator's selection of a component and notifying the operator of the results of the verification.
Figure 9:
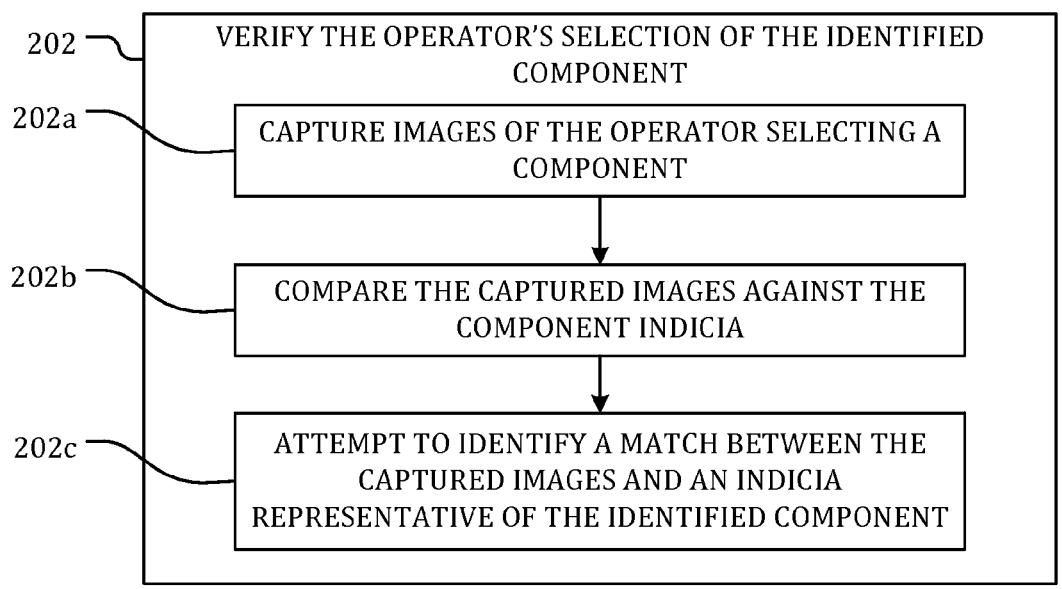
FIG. 9 is a flow diagram depicting the operations of a process for verifying the operator's selection of a component in the flow diagram of FIG. 8.

For instance, operations for a process 200 for verifying the operator 30's selection of the identified component 20 and notifying the operator 30 of the results of the verification are shown in FIG. 8. In operation 202, the operator 30's selection of the identified component 20 is verified with reference to the stored component indicia for the identified component 20, as generally shown in FIG. 9. The steps 202a-c shown in FIG. 9 may be performed in a substantially similar manner to the steps 158a-c, respectively, described above for scanning the assembly area 12 for the identified component 20, with the exception that, in step 202a, the camera 52 is controlled more particularly to capture the operator 30's selection of the identified component 20. The one or more images of the operator 30's selection of the identified component 20 could be captured at a time slightly before, concurrently with, and/or proceeding the operator 30's selection of the identified component 20.

Referring again to FIG. 8, in operation 204, it is determined whether the operator 30's selection of the identified component 20 was able to be verified, that is, whether a match was identified between a stored component indicia for the identified component 20 and an indicia recovered from the one or more images of the operator 30's selection of the identified component 20.

Figure 10A:
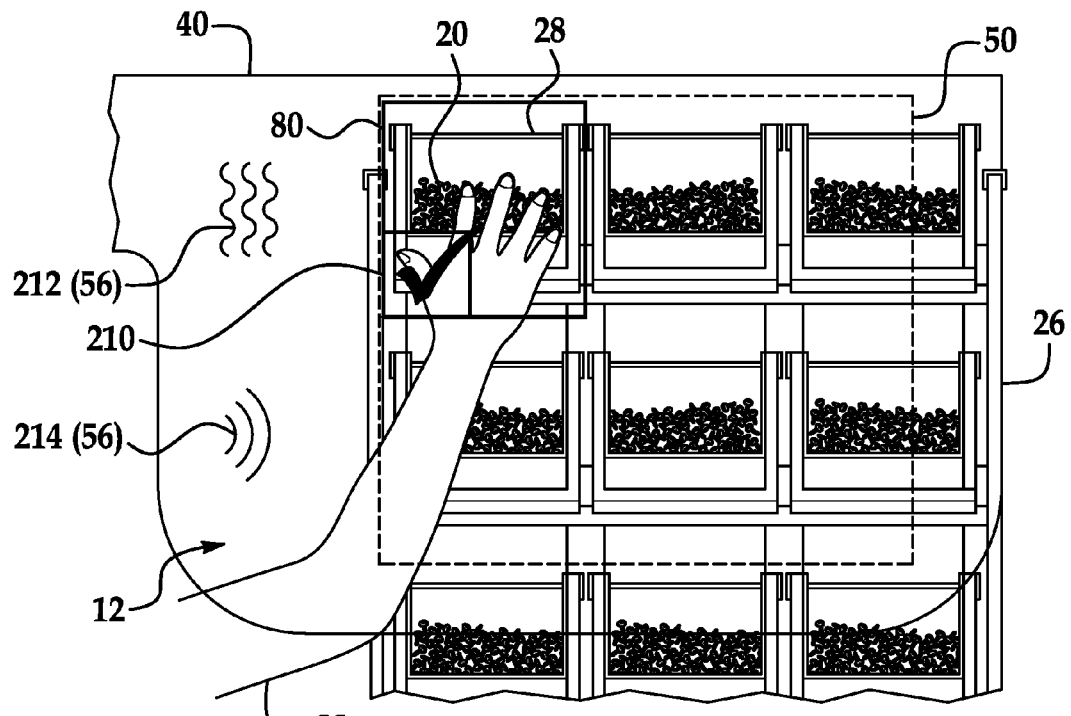
FIGS. 10A and 10B are perspective views of the assembly station, taken from the point of view of the operator wearing the wearable device, showing examples of notifying the operator of the results of the verification of the operator's selection of a component according to the process of FIG. 8.

If the operator 30's selection of the identified component 20 is able to be verified, in operation 206, a corresponding notification can be conveyed to the operator 30 using the wearable device 40. As generally shown in FIG. 10A, the notification can be displayed to the operator 30, for instance, by controlling the display 50 to display information to the operator 30, whether in the form of text, symbols or other visual elements that, either alone or in combination with the operator 30's visual apprehension of the assembly station 12, indicates that the identified component 20 is being or has been selected by the operator 30. As shown in the illustrated example, the display 50 may display a check box 210 adjacent the identified component 20 from the point of view of the operator 30, although other visual elements may be used, either steadily, for example, or in a flashing manner.

In addition or alternatively to displaying a notification to the operator 30 that the operator 30's selection of the identified component 20 is able to be verified, as generally shown, the wearable device 40 can be controlled via the operator output module 56 to provide, for instance, haptic feedback 212 and/or an appropriate audible tone or message 214 to convey the notification to the operator 30.

Figure 10B:
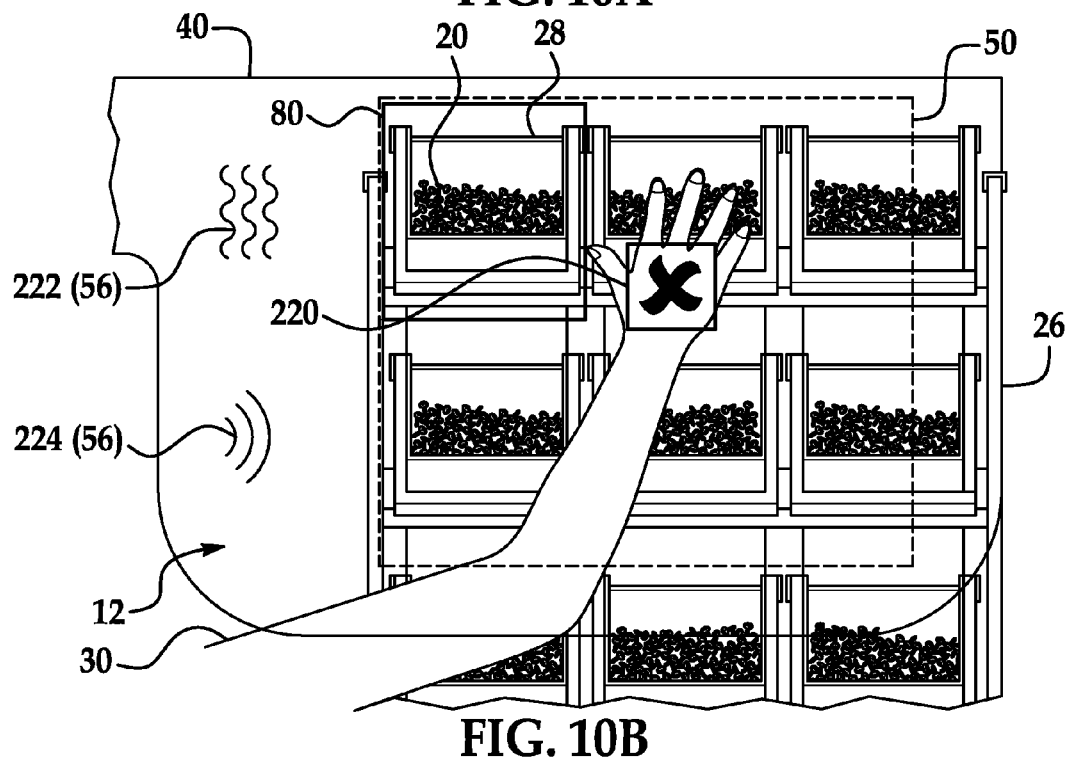

If the operator 30's selection of the identified component 20 is not able to be verified, in operation 208, a corresponding notification can be conveyed to the operator 30 using the wearable device 40. As generally shown in FIG. 10B, the notification can be displayed to the operator 30, for instance, by controlling the display 50 to display information to the operator 30, whether in the form of text, symbols or other visual elements that, either alone or in combination with the operator 30's visual apprehension of the assembly station 12, indicates that the identified component 20 is not being or has not been selected by the operator 30. As shown in the illustrated example, the display 50 may display an "x" 220 adjacent the operator 30's hand from the point of view of the operator 30, although other visual elements may be used, either steadily, for example, or in a flashing manner.

In addition or alternatively to displaying a notification to the operator 30 that the operator 30's selection of the identified component 20 is not able to be verified, as generally shown, the wearable device 40 can be controlled via the operator output module 56 to provide, for instance, haptic feedback 222 and/or an appropriate audible tone or message 224 to convey the notification to the operator 30.

The system 100 may optionally track metrics relating to the operator 30's overall accuracy in selecting the identified component 20 for given assembly operations. According to this example, it is contemplated that the operator 30 may, via manipulation of the operator input module 54, for example, have the option to backtrack from the selection of a component 20 upon receiving a notification that the selection of the identified component 20 was not able to be verified. In this example, on reselection of a component 20 by the operator 30, the process 200 could be repeated in an attempt to verify the operator 30's new selection.

The notification of whether the operator 30's selection of the identified component 20 is able to be verified may be performed in combination with indicating the position of the identified component 20, which for instance as illustrated in FIGS. 10A and 10B, is performed by displaying the box 80 around the identified component 20. In alternative implementations of the system 100, it will be understood that the notification of whether the operator 30's selection of the identified component 20 is able to be verified can be performed without indicating the position of the identified component 20.

Figure 11:
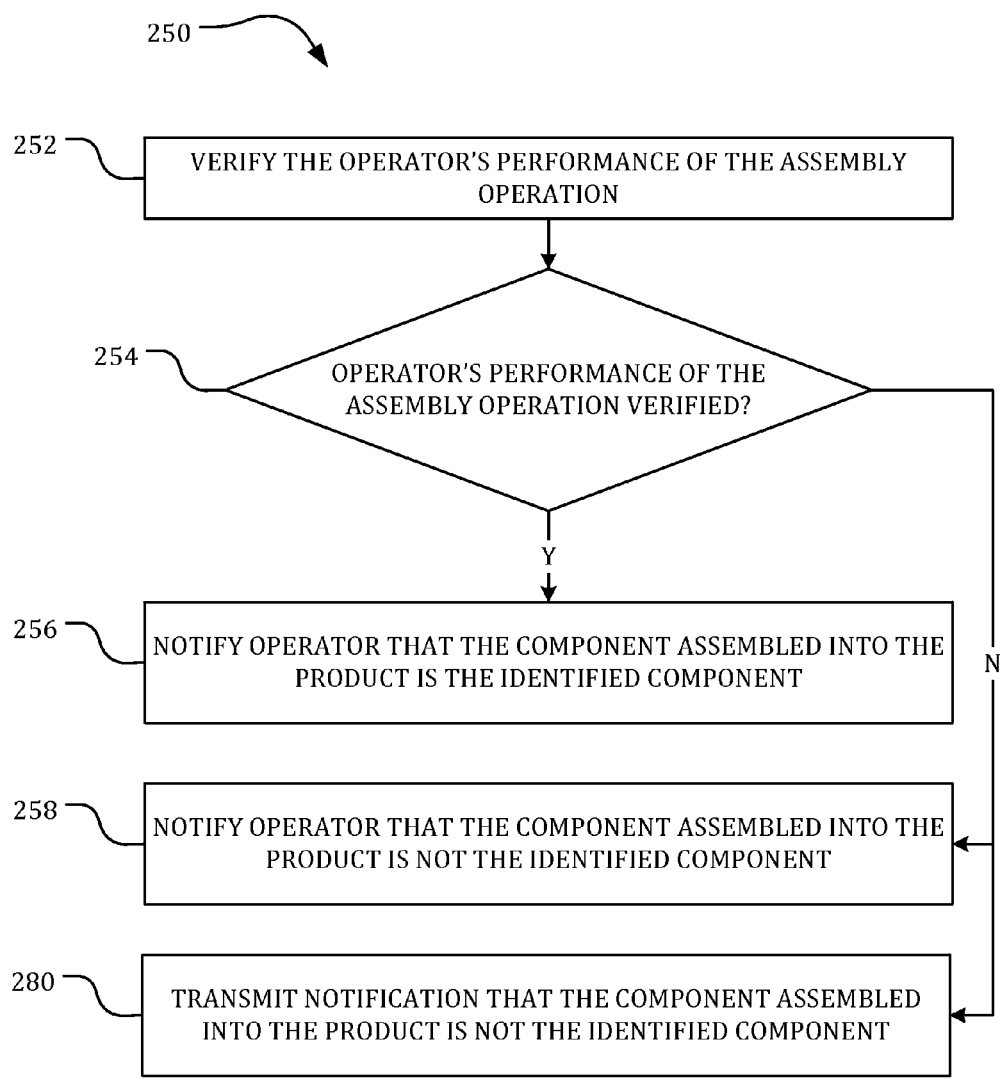
FIG. 11 is a flow diagram depicting the operations of a process for verifying the operator's performance of an assembly operation, notifying the operator of the results of the verification, and transmitting a notification to a third party if the operator's performance of the assembly operation cannot be verified.
Figure 12:
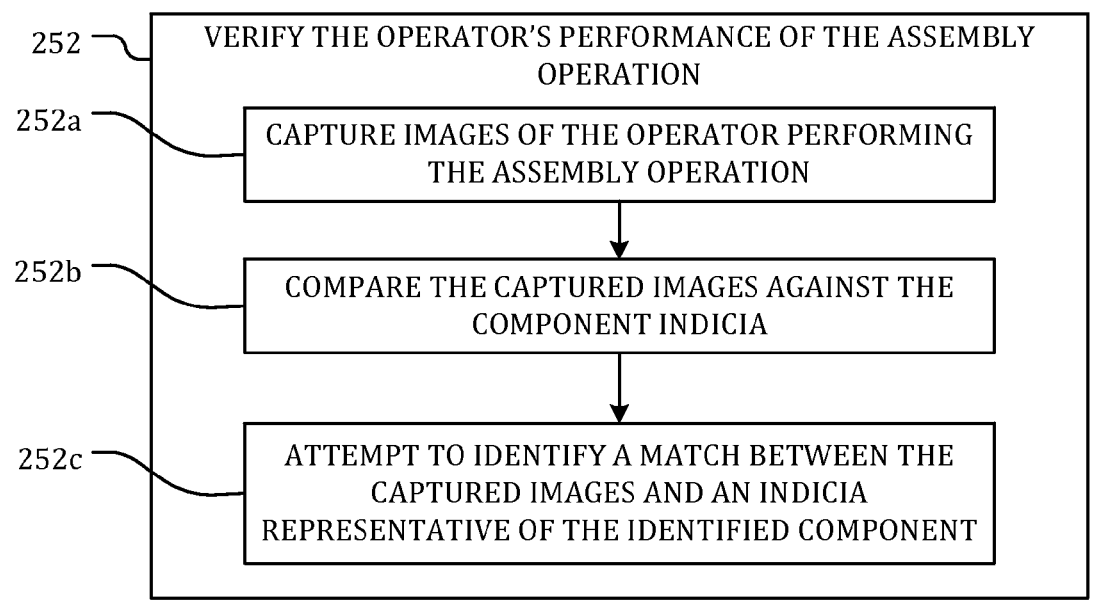
FIG. 12 is a flow diagram depicting the operations of a process for verifying the operator's performance of an assembly operation in the flow diagram of FIG. 11.

Operations for a process 250 for verifying the operator 30's performance of a given assembly operation using the identified component 20 and notifying the operator 30 of the results of the verification are shown in FIG. 11. In operation 252, the operator 30's performance of the assembly operation using the identified component 20 is verified with reference to the stored component indicia for the identified component 20, as generally shown in FIG. 12. The steps 252a-c shown in FIG. 12 may be performed in a substantially similar manner to the steps 158a-c, respectively, described above for scanning the assembly area 12 for the identified component 20, with the exception that, in step 252a, the camera 52 is controlled more particularly to capture the operator 30's performance of an assembly operation. The one or more images of the operator 30's performance of the assembly operation could be captured at a time slightly before, concurrently with, and/or proceeding the operator 30's performance of the assembly operation.

Referring again to FIG. 11, in operation 254, it is determined whether the operator 30's performance of the assembly operation using the identified component 20 was able to be verified, that is, whether a match was identified between a stored component indicia for the identified component 20 and an indicia recovered from the one or more images of the operator 30's performance of the assembly operation.

Figure 13A:
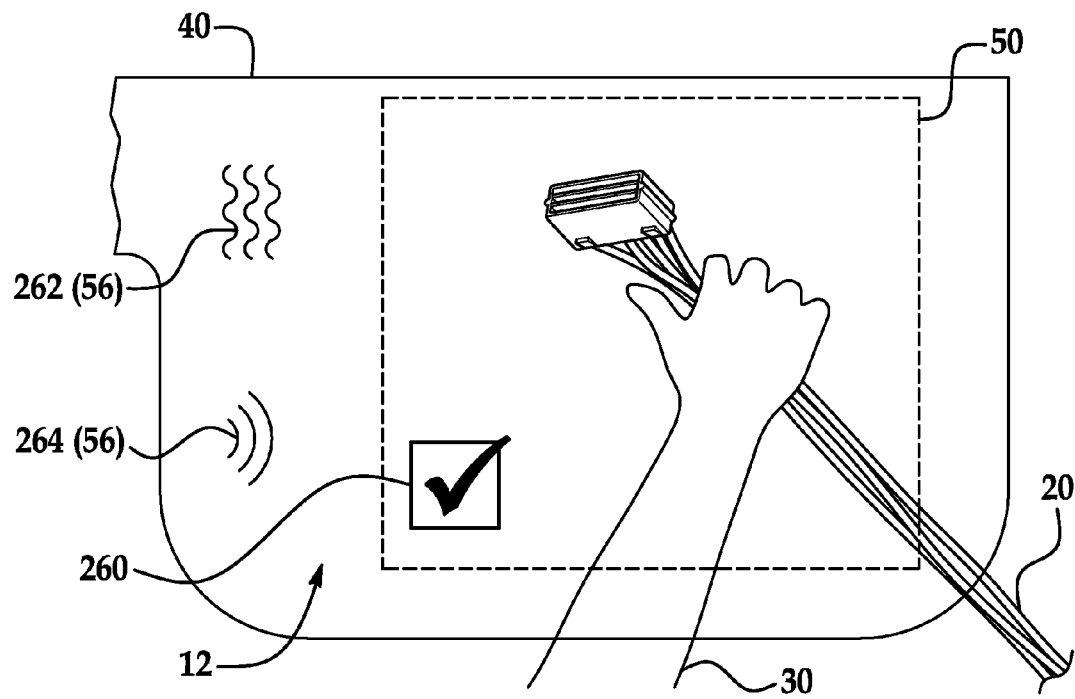
FIGS. 13A and 13B are perspective views of the assembly station, taken from the point of view of the operator wearing the wearable device, showing examples of notifying the operator of the results of the verification of the operator's performance of an assembly operation according to the process of FIG. 11.

If the operator 30's performance of the assembly operation using the identified component 20 is able to be verified, in operation 256, a corresponding notification can be conveyed to the operator 30 using the wearable device 40. As generally shown in FIG. 13A, the notification can be displayed to the operator 30, for instance, by controlling the display 50 to display information to the operator 30, whether in the form of text, symbols or other visual elements that, either alone or in combination with the operator 30's visual apprehension of the assembly station 12, indicates that the identified component 20 is being or has been used by the operator 30 in the assembly operation. As shown in the illustrated example, the display 50 may display a check box 260 adjacent the identified component 20 from the point of view of the operator 30, although other visual elements may be used, either steadily, for example, or in a flashing manner.

In addition or alternatively to displaying a notification to the operator 30 that the operator 30's performance of the assembly operation using the identified component 20 is able to be verified, as generally shown, the wearable device 40 can be controlled via the operator output module 56 to provide, for instance, haptic feedback 262 and/or an appropriate audible tone or message 264 to convey the notification to the operator 30.

Figure 13B:
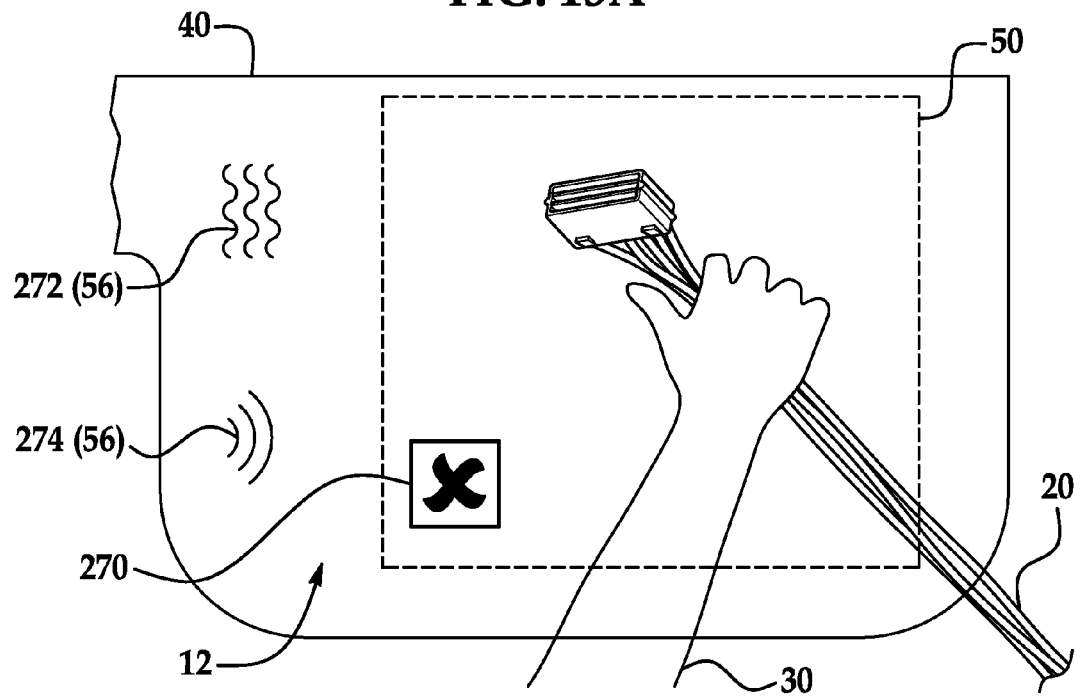

If the operator 30's performance of the assembly operation using the identified component 20 is not able to be verified, in operation 258, a corresponding notification can be conveyed to the operator 30 using the wearable device 40. As generally shown in FIG. 13B, the notification can be displayed to the operator 30, for instance, by controlling the display 50 to display information to the operator 30, whether in the form of text, symbols or other visual elements that, either alone or in combination with the operator 30's visual apprehension of the assembly station 12, indicates that the identified component 20 is not being or has not been used in the assembly operation. As shown in the illustrated example, the display 50 may display an "x" 270 adjacent the operator 30's hand from the point of view of the operator 30, although other visual elements may be used, either steadily, for example, or in a flashing manner.

In addition or alternatively to displaying a notification to the operator 30 that the operator 30's performance of the assembly operation using the identified component 20 is not able to be verified, as generally shown, the wearable device 40 can be controlled via the operator output module 56 to provide, for instance, haptic feedback 272 and/or an appropriate audible tone or message 274 to convey the notification to the operator 30.

Further, in operation 280, a separate notification that the operator 30's performance of the assembly operation using the identified component 20 is not able to be verified can be transmitted, for example, for display to a supervisor of the operator 30 using the display 112 of the supervisor device 110.

It will be understood that the illustrated wearable device 40 is presented as a non-limiting example conceived for use in a typical assembly environment. In other implementations, the wearable device 40 need not include, for example, the lenses 44, and could be otherwise configured to position the display 50 to display information to the operator 30 when worn.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computer-implemented method of aiding an operator at an assembly station, comprising:
    identifying, using a wearable device by the operator, one of a plurality of assembly stations as an assembly station in which the operator is located based on a determined location of the wearable device;
    determining, by a controller, an upcoming assembly operation of an assembly routine for the assembly station;
    identifying, by the controller, a component to be selected by the operator to use in the upcoming assembly operation;
    scanning the assembly station using a camera to capture at least one image of the assembly station;
    identifying a match between the at least one captured image and an indicia that is representative of the identified component;
    determining, by the controller based in part on the captured image, a position of the identified component within the assembly station; and
    displaying, using a display worn by the operator, the position of the identified component within the assembly station to the operator.

2. The method of claim 1, further comprising:
    determining the position of the identified component within the assembly station based on the identified match.

3. The method of claim 2, wherein the indicia representative of the identified component is one of a bar code, a part number or a depiction of the identified component.

4. The method of claim 1, further comprising:
    capturing, using the camera, at least one image of the operator selecting a stored component;
    attempting to identify a match between the at least one captured image and an indicia that is representative of the identified component; and
    if a match is not identified, transmitting a notification that the component selected by the operator to perform the assembly operation is not the identified component.

5. The method of claim 4, wherein the notification comprises one notification to the operator and another notification to a supervisor.

6. The method of claim 1, wherein determining the position of the identified component is further based on known configurations of the assembly station.

7. The method of claim 1, further comprising:
    collecting metrics of the operator's selections of identified components.

8. A device for aiding an operator at an assembly station, comprising:
    a display adapted to be worn by the operator;
    a camera adapted to be worn with the display by the operator; and
    a controller in communication with the display, the controller programmed to:
        identify one of a plurality of assembly stations as the assembly station in which the operator is located;
        determine an upcoming assembly operation of an assembly routine for the assembly station;
        operate the camera to capture at least one image of the assembly station;
        identify a component to be selected by the operator to use in the upcoming assembly operation by identifying a match between the at least one captured image of the assembly station and an indicia that is representative of the identified component; and
        in response to an identification of the identified component, and a determination, based on at least one captured image of the assembly station, of the position of the identified component within the assembly station, operate the display to display the position of the identified component within the assembly station to the operator.

9. The device of claim 8, further comprising:
    an eyewear frame configured for attachment to the operator's head, the display supported by the frame.

10. The device of claim 9, further comprising:
    a protective lens supported by the frame, wherein the display is positioned at the lens to display the position of the identified component within the assembly station to the operator.

11. The device of claim 8, wherein the controller is programmed to:
    determine the position of the identified component within the assembly station based on the identified match.

12. The device of claim 8, wherein the indicia representative of the identified component is one of a bar code, a part number or a depiction of the identified component.

13. The device of claim 8, wherein the device is a wearable device and the controller is programmed to:
    identify the component to be used in the assembly operation based on an assembly routine for the identified assembly station.

14. The device of claim 8, further comprising a transmitter, wherein the controller is programmed to:
    operate the camera to capture at least one image of the operator performing the assembly operation;

attempt to identify a match between the at least one captured image of the operator performing the assembly operation and an indicia that is representative of the identified component; and if a match is not identified, operate the transmitter to transmit a notification that the component used by the operator to perform the assembly operation is not the identified component.

15. A system for aiding an operator at an assembly station, comprising:

a display adapted to be worn by the operator;

a camera configured to capture images; and at least one controller in communication with the display and the camera, the at least one controller programmed to:

identify one of a plurality of assembly stations as the assembly station at which the operator is located;

determine an upcoming assembly operation of an assembly routine for the assembly station;

identify a component to be selected by the operator to use in the upcoming assembly operation;

operate the camera to capture at least one image of the assembly station;

determine the position of the identified component within the assembly station based on the at least one captured image of the assembly station by identifying a match between the at least one captured image of the assembly station and an indicia that is representative of the identified component; and operate the display to display the determined position of the identified component within the assembly station to the operator.

16. The system of claim 15, wherein the at least one controller is programmed to:

determine the position of the identified component within the assembly station based on the identified match.

17. The system of claim 15, wherein the indicia representative of the identified component is one of a bar code, a part number or a depiction of the identified component.

18. The system of claim 15, further comprising a transmitter, wherein the at least one controller is programmed to:

operate the camera to capture at least one image of the operator performing the assembly operation;

attempt to identify a match between the at least one captured image of the operator performing the assembly operation and an indicia that is representative of the identified component; and if a match is not identified, operate the transmitter to transmit a notification that the component used by the operator to perform the assembly operation is not the identified component.

\* \* \* \* \*